US011144210B2

(12) United States Patent
Yeh

(10) Patent No.: US 11,144,210 B2
(45) Date of Patent: Oct. 12, 2021

(54) VALID DATA MERGING METHOD, MEMORY CONTROL CIRCUIT UNIT AND MEMORY STORAGE APPARATUS

(71) Applicant: PHISON ELECTRONICS CORP., Miaoli (TW)

(72) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 16/527,064

(22) Filed: Jul. 31, 2019

(65) Prior Publication Data

US 2020/0401322 A1 Dec. 24, 2020

(30) Foreign Application Priority Data

Jun. 24, 2019 (TW) ................................. 108121902

(51) Int. Cl.
*G06F 12/00* (2006.01)
*G06F 3/06* (2006.01)
*G06F 7/14* (2006.01)

(52) U.S. Cl.
CPC .......... *G06F 3/0616* (2013.01); *G06F 3/0652* (2013.01); *G06F 3/0679* (2013.01); *G06F 7/14* (2013.01)

(58) Field of Classification Search
CPC .... G06F 3/0616; G06F 3/0652; G06F 3/0679; G06F 7/14
See application file for complete search history.

(56) References Cited

U.S. PATENT DOCUMENTS

| 9,720,820 | B2* | 8/2017 | Chu | G06F 12/0246 |
| 9,959,060 | B1* | 5/2018 | Tang | G06F 3/0644 |
| 10,417,123 | B1* | 9/2019 | Souri | G06F 12/0253 |
| 10,474,527 | B1* | 11/2019 | Sun | G06F 11/1068 |
| 10,620,874 | B2* | 4/2020 | Yan | G06F 3/0655 |
| 2012/0072639 | A1* | 3/2012 | Goss | G06F 12/0246 711/103 |
| 2012/0265922 | A1* | 10/2012 | Post | G11C 16/349 711/103 |
| 2013/0132640 | A1* | 5/2013 | Wu | G06F 12/0246 711/103 |

(Continued)

FOREIGN PATENT DOCUMENTS

| TW | 201801089 | 1/2018 |
| TW | 201835753 | 10/2018 |

*Primary Examiner* — Prasith Thammavong
(74) *Attorney, Agent, or Firm* — JCIPRNET

(57) ABSTRACT

A valid data merging method, a memory control circuit unit, and a memory storage device are provided. The method includes: obtaining a first system parameter corresponding to a first region and a second system parameter corresponding to a second region; determining whether the first system parameter is greater than the second system parameter; selecting a third physical erasing unit from the second region preferentially and performing a valid data merging operation by using the third physical erasing unit when the first system parameter is greater than the second system parameter; and selecting a fourth physical erasing unit from the first region preferentially and performing the valid data merging operation by using the fourth physical erasing unit when the first system parameter is not greater than the second system parameter.

15 Claims, 5 Drawing Sheets

(56) References Cited

U.S. PATENT DOCUMENTS

| | | | |
|---|---|---|---|
| 2013/0145085 A1* | 6/2013 | Yu | G06F 12/0246 |
| | | | 711/103 |
| 2013/0282955 A1* | 10/2013 | Parker | G06F 12/0246 |
| | | | 711/103 |
| 2014/0181434 A1* | 6/2014 | Chau | G11C 16/349 |
| | | | 711/162 |
| 2016/0103762 A1* | 4/2016 | Rastogi | G06F 12/0246 |
| | | | 711/103 |
| 2016/0188219 A1* | 6/2016 | Peterson | G06F 12/0246 |
| | | | 711/103 |
| 2016/0188221 A1* | 6/2016 | Janik | G06F 3/0655 |
| | | | 711/103 |
| 2016/0232088 A1* | 8/2016 | Mohan | G06F 12/0246 |
| 2016/0283369 A1* | 9/2016 | Hada | G06F 12/0246 |
| 2017/0046068 A1* | 2/2017 | Tan | G06F 12/0246 |
| 2017/0132069 A1* | 5/2017 | Wang | G06F 11/0793 |
| 2017/0228162 A1* | 8/2017 | Tan | G06F 3/0679 |
| 2017/0285971 A1* | 10/2017 | Dai | G06F 12/0246 |
| 2017/0286288 A1* | 10/2017 | Higgins | G06F 11/1048 |
| 2017/0329542 A1* | 11/2017 | Chou | G06F 3/0659 |
| 2017/0371794 A1* | 12/2017 | Kan | G06F 3/0656 |
| 2018/0157586 A1* | 6/2018 | Yi | G06F 12/0246 |
| 2018/0165009 A1* | 6/2018 | Hsiao | G06F 3/061 |
| 2018/0267720 A1* | 9/2018 | Goldberg | G06F 3/0619 |
| 2018/0300235 A1* | 10/2018 | Hu | G06F 3/0688 |
| 2019/0369899 A1* | 12/2019 | Tanpairoj | G06F 1/3234 |

* cited by examiner

VALID DATA MERGING METHOD, MEMORY CONTROL CIRCUIT UNIT AND MEMORY STORAGE APPARATUS

CROSS-REFERENCE TO RELATED APPLICATION

This application claims the priority benefit of Taiwan application serial no. 108121902, filed on Jun. 24, 2019. The entirety of the above-mentioned patent application is hereby incorporated by reference herein and made a part of this specification.

BACKGROUND

Technical Field

The invention relates to a valid data merging method, a memory control circuit unit and a memory storage apparatus.

Description of Related Art

The growth of digital cameras, mobile phones, and MP3 players has been rapid in recent years. Consequently, the consumers' demand for storage media has increased tremendously. A rewritable non-volatile memory is one of the most adaptable memories for portable electronic products such as laptop computer due to its data non-volatility, low power consumption, small volume, non-mechanical structure and high read/write speed. A solid state drive (SSD) is a memory storage apparatus which utilizes a flash memory module as a storage medium. For these reasons, the flash memory has become an import part of the electronic industries.

In general, the physical erasing units of the rewritable non-volatile memory module can be logically grouped into an SLC area and a TLC area. The number of physical erasing units in the SLC area and the number of physical erasing units in the TLC area are set before the rewritable non-volatile memory module is shipped from the factory. Depending on an user's usage habits or an operating logic of an application, the ratio in which the physical erasing units in the SLC area are used is also different from the ratio in which the physical erasing units in the TLC area are used. Thus, when the rewritable non-volatile memory module reaches the end of the life cycle (e.g., the sum of wear level values of all physical erasing units is greater than a threshold), one of the SLC area and the TLC area may not have reached the maximum amount of writes (e.g., number of writes) that the area can withstand.

However, how the SLC area and the TLC area can simultaneously achieve the maximum amount of writes at the same time when the rewritable non-volatile memory module reaches the end of the life cycle, which is one of the problems that one skilled in the art would like to solve.

SUMMARY

The valid data merging method, the memory control circuit unit and the memory storage apparatus of the present invention may let the SLC area and the TLC area simultaneously reach the maximum amount of writes that the area can withstand when the rewritable non-volatile memory module reaches the end of the life cycle.

A valid data merging method for a rewritable non-volatile memory module is provided. The rewritable non-volatile memory module includes a plurality of physical erasing units, the plurality of physical erasing units are grouped into at least a first area and a second area, the first area includes a plurality of first physical erasing units of the plurality of physical erasing units and the second area includes a plurality of second physical erasing units of the plurality of physical erasing units. The valid data merging method comprises: obtaining a first system parameter corresponding to the first area and a second system parameter corresponding to the second area when performing a valid data merging operation; determining whether the first system parameter is greater than the second system parameter; when the first system parameter is greater than the second system parameter, preferentially selecting a third physical erasing unit from the plurality of second physical erasing units of the second area, and performing the valid data merging operation by using the third physical erasing unit; and when the first system parameter is not greater than the second system parameter, preferentially selecting a fourth physical erasing unit from the plurality of first physical erasing units of the first area, and performing the valid data merging operation by using the fourth physical erasing unit.

A memory control circuit unit for controlling a rewritable non-volatile memory module is provided. The memory control circuit unit comprises: a host interface, a memory interface and a memory management circuit. The host interface is configured to couple to a host system. The memory interface is configured to couple to the rewritable non-volatile memory module, wherein the rewritable non-volatile memory module includes a plurality of physical erasing units, the plurality of physical erasing units are grouped into at least a first area and a second area, the first area includes a plurality of first physical erasing units of the plurality of physical erasing units and the second area includes a plurality of second physical erasing units of the plurality of physical erasing units. The memory management circuit is coupled to the host interface and the memory interface and configured to perform the following operations: obtaining a first system parameter corresponding to the first area and a second system parameter corresponding to the second area when performing a valid data merging operation; determining whether the first system parameter is greater than the second system parameter; when the first system parameter is greater than the second system parameter, preferentially selecting a third physical erasing unit from the plurality of second physical erasing units of the second area, and performing the valid data merging operation by using the third physical erasing unit; and when the first system parameter is not greater than the second system parameter, preferentially selecting a fourth physical erasing unit from the plurality of first physical erasing units of the first area, and performing the valid data merging operation by using the fourth physical erasing unit.

A memory storage apparatus is provided. The memory storage apparatus includes: a connection interface unit, a rewritable non-volatile memory module, and a memory control circuit unit. The connection interface unit is configured to couple to a host system. The rewritable non-volatile memory module includes a plurality of physical erasing units, the plurality of physical erasing units are grouped into at least a first area and a second area, the first area includes a plurality of first physical erasing units of the plurality of physical erasing units and the second area includes a plurality of second physical erasing units of the plurality of physical erasing units. The memory control circuit unit is coupled to the connection interface unit and the rewritable non-volatile memory module and configured to perform the following operations: obtaining a first system parameter corresponding to the first area and a second system parameter corresponding to the second area when performing a valid data merging operation; determining whether the first system parameter is greater than the second system parameter; when the first system parameter is greater than the second system parameter, preferentially selecting a third physical erasing unit from the plurality of second physical erasing units of the second area, and performing the valid data merging operation by using the third physical erasing unit; and when the first system parameter is not greater than the second system parameter, preferentially selecting a fourth physical erasing unit from the plurality of first physical erasing units of the first area, and performing the valid data merging operation by using the fourth physical erasing unit.

Accordingly, the valid data merging method, the memory control circuit unit and the memory storage apparatus of the present invention may select a physical erasing unit from one of the SLC area and the TLC area for writing in performing the valid data merging operation according to a system parameter corresponding to the SLC area and a system parameter corresponding to the TLC area. Thereby, the ratio of both the SLC area and the TLC area in use is made close. By the above manner, it is possible to prevent the problem that one of the SLC area and the TLC area may not have reached the maximum amount of writes that the area can withstand when the rewritable non-volatile memory module reaches the end of the life cycle.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
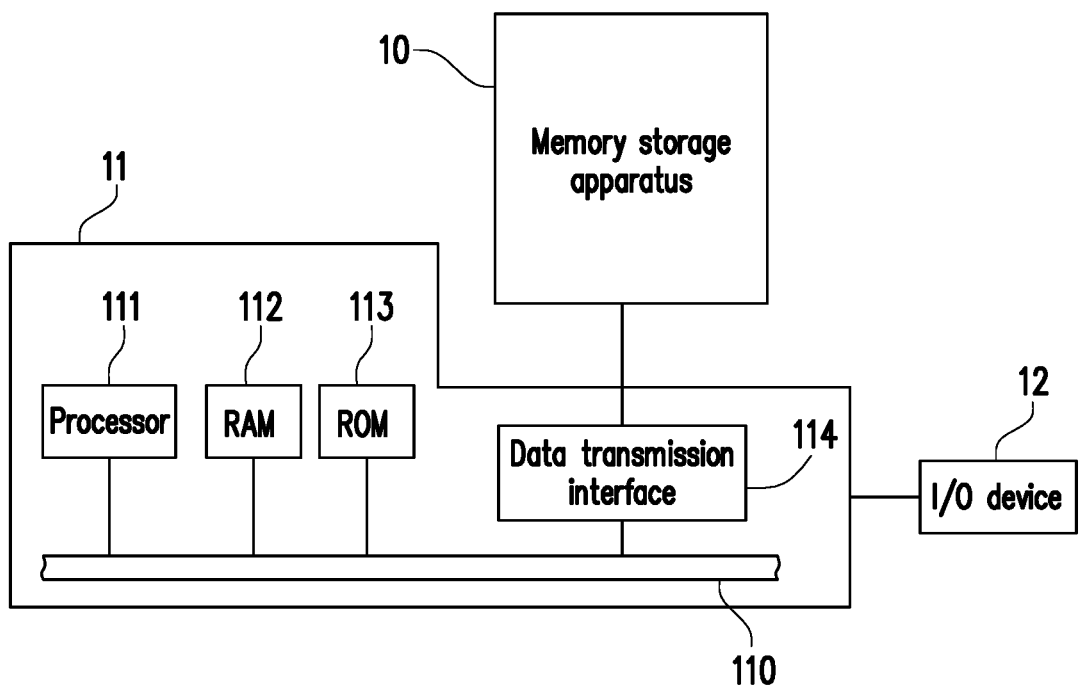
FIG. 1 is a schematic diagram illustrating a host system, a memory storage apparatus and an I/O (input/output) device according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage apparatus (also known as a memory storage system) includes a rewritable non-volatile memory module and a controller (also known as a control circuit). The memory storage apparatus is usually configured together with a host system so the host system can write data into or read data from the memory storage apparatus.

Figure 2:
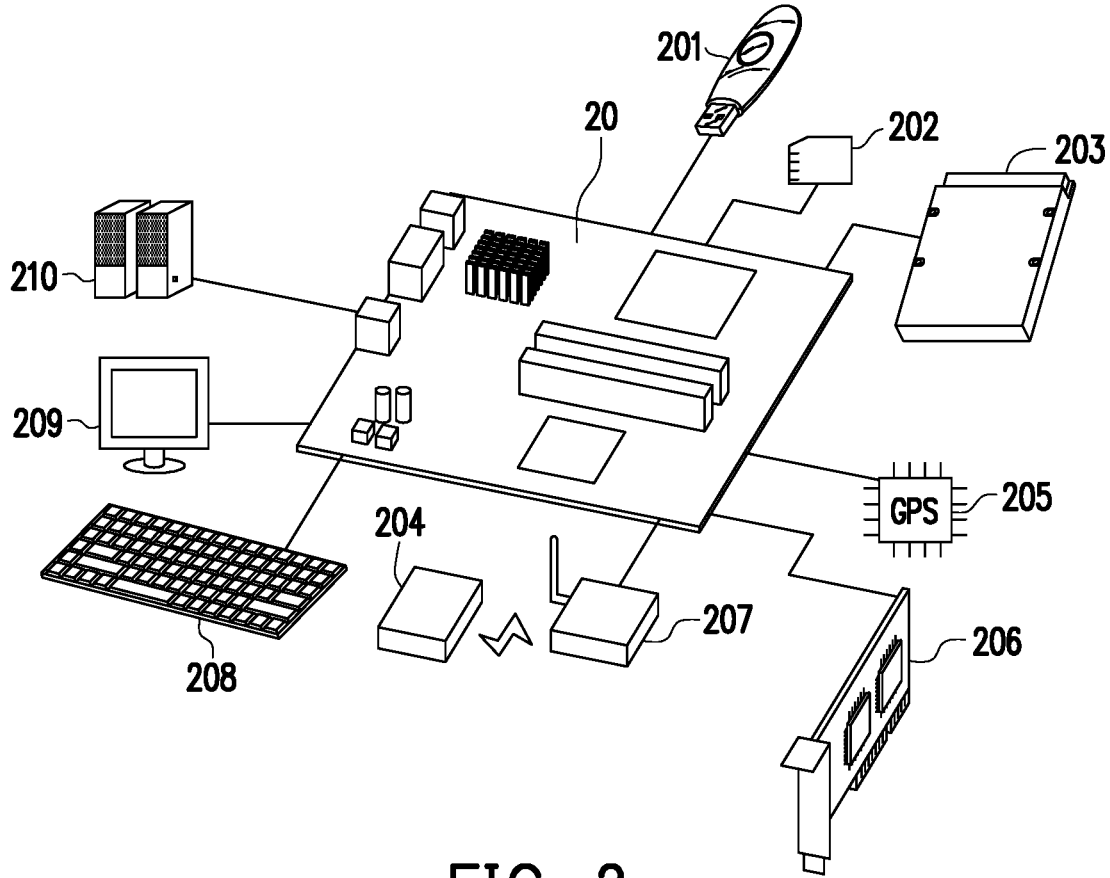
FIG. 2 is a schematic diagram illustrating a host system, a memory storage apparatus and an I/O device according to another exemplary embodiment of the invention.

FIG. 1 is a schematic diagram illustrating a host system, a memory storage apparatus and an I/O (input/output) device according to an exemplary embodiment of the invention. FIG. 2 is a schematic diagram illustrating a host system, a memory storage apparatus and an I/O device according to another exemplary embodiment of the invention.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In the present exemplary embodiment, the host system 11 is coupled to a memory storage apparatus 10 through the data transmission interface 114. For example, the host system 11 can write data into the memory storage apparatus 10 or read data from the memory storage apparatus 10 through the data transmission interface 114. Further, the host system 11 is coupled to an I/O device 12 through the system bus 110. For example, the host system 11 can transmit output signals to the I/O device 12 or receive input signals from the I/O device 12 through the system bus 110.

In the present exemplary embodiment, the processor 111, the RAM 112, the ROM 113 and the data transmission interface 114 may be disposed on a main board 20 of the host system 11. The number of the data transmission interface 114 may be one or more. Through the data transmission interface 114, the main board 20 may be coupled to the memory storage apparatus 10 in a wired manner or a wireless manner. The memory storage apparatus 10 may be, for example, a flash drive 201, a memory card 202, a SSD (Solid State Drive) 203 or a wireless memory storage apparatus 204. The wireless memory storage apparatus 204 may be, for example, a memory storage apparatus based on various wireless communication technologies, such as a NFC (Near Field Communication) memory storage apparatus, a WiFi (Wireless Fidelity) memory storage apparatus, a Bluetooth memory storage apparatus, a BLE (Bluetooth low energy) memory storage apparatus (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage apparatus 204 through the wireless transmission device 207.

Figure 3:
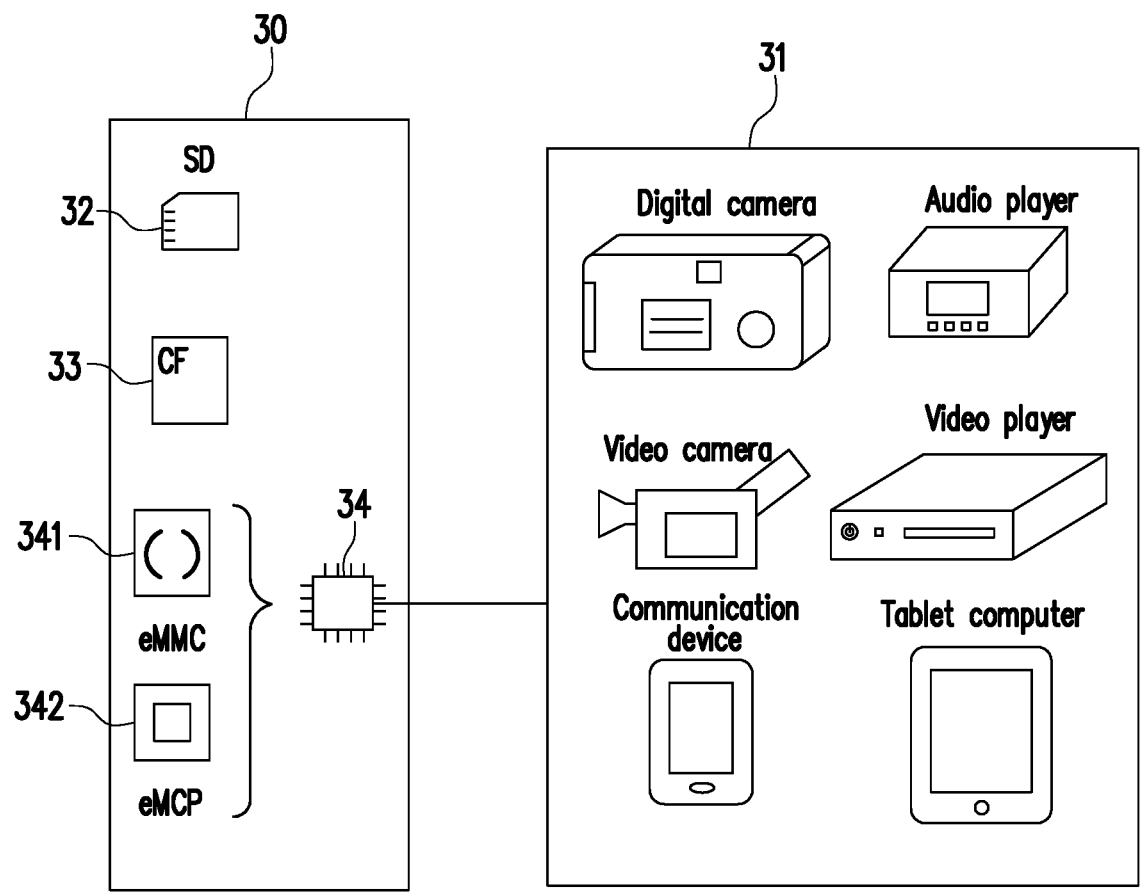
FIG. 3 is a schematic diagram illustrating a host system and a memory storage apparatus according to another exemplary embodiment of the invention.

In an exemplary embodiment, aforementioned host system may be any system capable of substantially cooperating with the memory storage apparatus for storing data. Although the host system is illustrated as a computer system in foregoing exemplary embodiment, nonetheless, FIG. 3 is a schematic diagram illustrating a host system and a memory storage apparatus according to another exemplary embodiment of the invention. Referring to FIG. 3, in another exemplary embodiment, a host system 31 may also be a system including a digital camera, a video camera, a communication device, an audio player, a video player or a tablet computer, whereas a memory storage apparatus 30 may be various non-volatile memory devices used by the host system, such as a SD card 32, a CF card 33 or an embedded storage device 34. The embedded storage device 34 includes various embedded storage devices capable of directly coupling a memory module onto a substrate of the host system, such as an eMMC (embedded MMC) 341 and/or an eMCP (embedded Multi Chip Package) 342.

Figure 4:
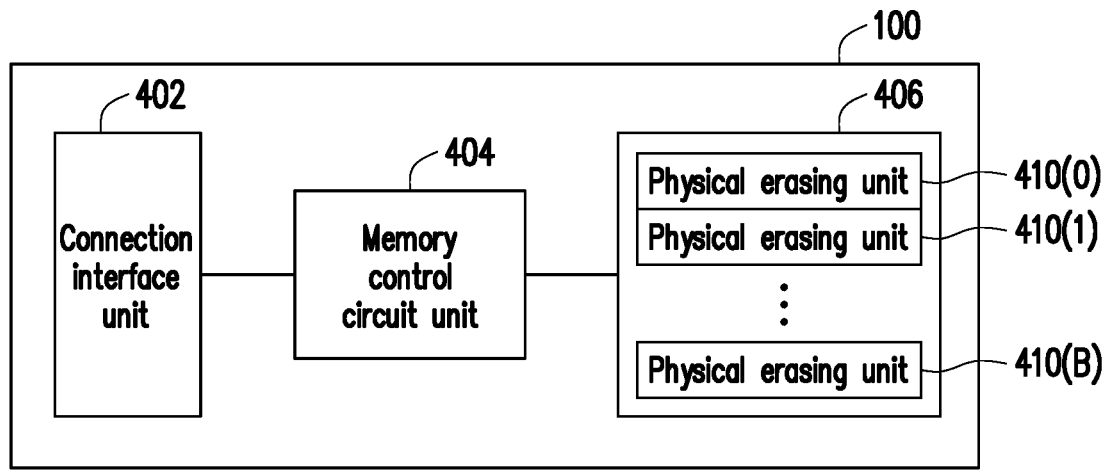
FIG. 4 is a schematic block diagram illustrating a memory storage apparatus according to an exemplary embodiment of the invention.

FIG. 4 is a schematic block diagram illustrating a memory storage apparatus according to an exemplary embodiment of the invention.

Referring to FIG. 4, the memory storage apparatus 10 includes a connection interface unit 402, a memory control circuit unit 404 and a rewritable non-volatile memory module 406.

In the present exemplary embodiment, the connection interface unit 402 is compatible with a SATA (Serial Advanced Technology Attachment) standard. Nevertheless, it should be understood that the invention is not limited thereto. The connection interface unit 402 may also be compatible to a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a SD (Secure Digital) interface standard, a UHS-I (Ultra High Speed-I) interface standard, a UHS-II (Ultra High Speed-II) interface standard, a MS (Memory Stick) interface standard, a Multi-Chip Package interface standard, a MMC (Multi Media Card) interface standard, an eMMC (Embedded Multimedia Card) interface standard, a UFS (Universal Flash Storage) interface standard, an eMCP (embedded Multi Chip Package) interface standard, a CF (Compact Flash) interface standard, an IDE (Integrated Device Electronics) interface standard or other suitable standards. The connection interface unit 402 and the memory control circuit unit 404 may be packaged into one chip, or the connection interface unit 402 is distributed outside of a chip containing the memory control circuit unit 404.

The memory control circuit unit 404 is configured to execute a plurality of logic gates or control commands which are implemented in a hardware form or in a firmware form and perform operations of writing, reading or erasing data in the rewritable non-volatile memory storage module 406 according to the commands of the host system 11.

The rewritable non-volatile memory module 406 is coupled to the memory control circuit unit 404 and configured to store data written from the host system 11. The rewritable non-volatile memory module 406 may be a SLC (Single Level Cell) NAND flash memory module (i.e., a flash memory module capable of storing one bit in one memory cell), a MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), other flash memory modules or any memory module having the same features.

The rewritable non-volatile memory module 406 is coupled to the memory control circuit unit 404 and configured to store data written from the host system 11. The rewritable non-volatile memory storage module 406 includes multiple physical erasing units 410(0) to 410(B). For example, the physical erasing units 410(0) to 410(B) may belong to the same memory die or belong to different memory dies. Each physical erasing unit has a plurality of physical programming units, and the physical programming units of the same physical erasing unit may be written separately and erased simultaneously. Nevertheless, it should be understood that the invention is not limited thereto. Each physical erasing unit may be constituted by 64 physical programming units, 256 physical programming units or any amount of the physical programming units.

Figure 5:
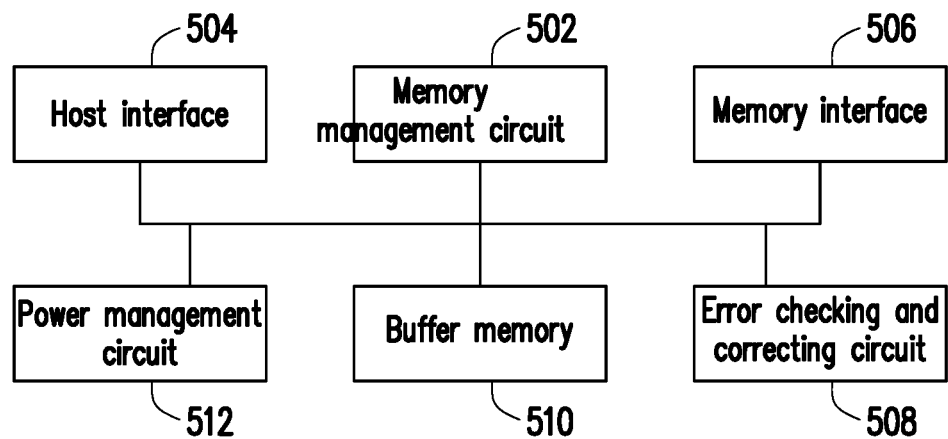
FIG. 5 is a schematic block diagram illustrating a memory control circuit unit according to an exemplary embodiment of the invention.

FIG. 5 is a schematic block diagram illustrating a memory control circuit unit according to an exemplary embodiment of the invention.

Referring to FIG. 5, the memory control circuit unit 404 includes a memory management circuit 502, a host interface 504 and a memory interface 506.

The memory management circuit 502 is configured to control overall operations of the memory control circuit unit 404. Specifically, the memory management circuit 502 has a plurality of control commands and the control commands are executed to perform various operations such as writing, reading and erasing data during operation of the memory storage apparatus 10. Hereinafter, operations of the memory management circuit 502 are described as equivalent to describe operations of the memory control circuit unit 404.

In the present exemplary embodiment, the control commands of the memory management circuit 502 are implemented in form of firmware. For instance, the memory management circuit 502 has a microprocessor unit (not illustrated) and a ROM (not illustrated), and the control commands are burned into the ROM. When the memory storage apparatus 10 operates, the control commands are executed by the microprocessor to perform operations of writing, reading or erasing data.

In another exemplary embodiment, the control commands of the memory management circuit 502 may also be stored as program codes in a specific area (for example, the system area in a memory exclusively used for storing system data) of the rewritable non-volatile memory module 406. In addition, the memory management circuit 502 has a microprocessor unit (not illustrated), the read only memory (not illustrated) and a random access memory (not illustrated). More particularly, the ROM has a boot code, which is executed by the microprocessor unit to load the control commands stored in the rewritable non-volatile memory module 406 to the RAM of the memory management circuit 502 when the memory control circuit unit 404 is enabled. Then, the control commands are executed by the microprocessor unit to perform operations, such as writing, reading or erasing data.

Further, in another exemplary embodiment, the control commands of the memory management circuit 502 may also be implemented in a form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the memory cells of the rewritable non-volatile memory module 406 or a group thereof. The memory writing circuit is configured to give a write command sequence for the rewritable non-volatile memory module 406 in order to write data into the rewritable non-volatile memory module 406. The memory reading circuit is configured to give a read command sequence for the rewritable non-volatile memory module 406 in order to read data from the rewritable non-volatile memory module 406. The memory erasing circuit is configured to give an erase command sequence for the rewritable non-volatile memory module 406 in order to erase data from the rewritable non-volatile memory module 406. The data processing circuit is configured to process both the data to be written into the rewritable non-volatile memory module 406 and the data read from the rewritable non-volatile memory module 406. Each of the write command sequence, the read command sequence and the erase command sequence may include one or more program codes or command codes, and instruct the rewritable non-volatile memory module 406 to perform the corresponding operations, such as writing, reading and erasing. In an exemplary embodiment, the memory management circuit 502 may further give command sequence of other types to the rewritable non-volatile memory module 406 for instructing to perform the corresponding operations.

The host interface 504 is coupled to the memory management circuit 502 and configured to receive and identify commands and data sent from the host system 11. In other words, the commands and data transmitted by the host system 11 are transmitted to the memory management circuit 502 through the host interface 504. In the present exemplary embodiment, the host interface 504 is compatible with the SATA standard. However, it is to be understood that the invention is not limited thereto. The host interface 504 may also compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable standards for data transmission.

The memory interface 506 is coupled to the memory management circuit 502 and configured to access the rewritable non-volatile memory module 406. In other words, data to be written to the rewritable non-volatile memory module 406 is converted into a format acceptable by the rewritable non-volatile memory module 406 through the memory interface 506. Specifically, if the memory management circuit 502 intends to access the rewritable non-volatile memory module 406, the memory interface 506 sends corresponding command sequences. For example, the command sequences may include the write command sequence which instructs to write data, the read command sequence which instructs to read data, the erase command sequence which instructs to erase data, and other corresponding command sequences for instructing to perform various memory operations (e.g., changing read voltage levels or performing a garbage collection procedure). These command sequences are generated by the memory management circuit 502 and transmitted to the rewritable non-volatile memory module 406 through the memory interface 506, for example. The command sequences may include one or more signals, or data transmitted in the bus. The signals or the data may include command codes and program codes. For example, information such as identification codes and memory addresses are included in the read command sequence.

In an exemplary embodiment, the memory control circuit unit 404 further includes an error checking and correcting circuit 508, a buffer memory 510 and a power management circuit 512.

The error checking and correcting circuit 508 is coupled to the memory management circuit 502 and configured to perform an error checking and correcting operation to ensure integrity of data. Specifically, when the memory management circuit 502 receives the write command from the host system 11, the error checking and correcting circuit 508 generates an ECC (error correcting code) and/or an EDC (error detecting code) for data corresponding to the write command, and the memory management circuit 502 writes data corresponding to the write command and the corresponding ECC and/or the EDC into the rewritable non-volatile memory module 406. Then, when the memory management circuit 502 reads the data from the rewritable non-volatile memory module 406, the corresponding ECC and/or the EDC are also read, and the error checking and correcting circuit 508 performs the error checking and correcting operation on the read data based on the ECC and/or the EDC.

The buffer memory 510 is coupled to the memory management circuit 502 and configured to temporarily store data and commands from the host system 11 or data from the rewritable non-volatile memory module 406. The power management unit 512 is coupled to the memory management circuit 502 and configured to control a power of the memory storage apparatus 10.

It is noted that in the following description, some terms may be replaced with corresponding abbreviations for ease of reading (see Table 1).

TABLE 1

| logical-to-physical mapping table | L2P table |
| rewritable non-volatile memory module | RNVM module |
| physical erasing unit | PU |
| physical erasing unit | PEU |
| physical programming unit | PPU |
| logical unit | LU |
| logical erasing unit | LEU |
| logical programming unit | LPU |
| memory management circuit | MMC |
| memory control circuit unit | MCCU |

In the present exemplary embodiment, the memory cells of the RNVM module 406 constitute a plurality of PPUs, and the PPUs constitute a plurality of PEUs. For example, the memory cells on the same word line constitute one or more PPUs. If each of the memory cells can store more than one bit, the PPUs on the same word line can be at least classified into a lower PPU and an upper PPU. For instance, a least significant bit (LSB) of one memory cell belongs to the lower PPU, and a most significant bit (MSB) of one memory cell belongs to the upper PPU. Generally, in the MLC NAND flash memory, a writing speed of the lower PPU is higher than a writing speed of the upper PPU, and/or a reliability of the lower PPU is higher than a reliability of the upper PPU.

In the present exemplary embodiment, the PPU is the minimum unit for programming. That is, the PPU is the minimum unit for writing data. For example, the PPU is a physical page or a physical sector. When the PPUs are the physical page, these PPUs usually include a data bit area and a redundancy bit area. The data bit area includes multiple physical sectors configured to store user data, and the redundant bit area is configured to store system data (e.g., an error correcting code).

In the present exemplary embodiment, the data bit area includes 32 physical sectors, and a size of each physical sector is 512 bytes (B). However, in other exemplary embodiments, the data bit area may also include 8, 16 physical sectors or different number (more or less) of the physical sectors, and the size of each physical sector may also be greater or smaller. On the other hand, the PEU is the minimum unit for erasing. Namely, each PEU contains the least number of memory cells to be erased together. For instance, the PEU is a physical block.

Figure 6:
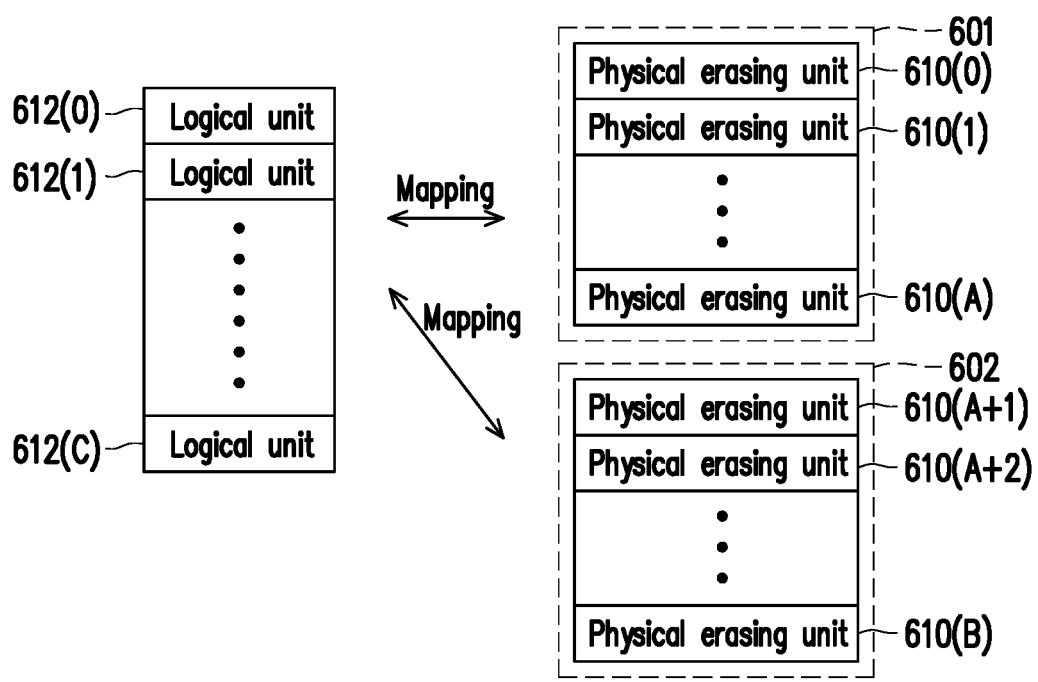
FIG. 6 is a schematic diagram illustrating management of a rewritable non-volatile memory module according to an exemplary embodiment of the invention.

FIG. 6 is a schematic diagram illustrating management of a RNVM module according to an exemplary embodiment of the invention. It should be understood that terms, such as "select" and "group", are logical concepts which describe operations in the PEUs of the RNVM module 406. That is to say, the PEUs of the RNVM module 406 are logically operated while actual locations of the PEUs of the RNVM module 406 remain unchanged.

Referring to FIG. 6, in the present exemplary embodiment, the MMC 502 logically groups PEUs 610(0) to 610(B) of the RNVM module 406 into a storage area and a spare area. The PEUs in the storage area are stored with data, and the PEUs in the spare area are not yet used for storing data. For example, each PEU belonging to the storage area may be stored with valid data and/or invalid data, and one PEU belonging to the storage area being erased is associated to the spare area. After one PEU belonging to the storage area is fully written, one specific PEU is then selected from the spare area and associated to the storage area for storing other data.

Further, in the present exemplary embodiment, the MMC 502 also logically groups the PEUs 610(0) to 610(B) of the RNVM module 406 into a SLC area 601 (hereinafter, also known as a first area) and a TLC area 602 (hereinafter, also known as a second area), and assigns LUs 612(0) to 612(C) for mapping to part of the PEUs among the PEUs 610(0) to 610(A) of the SLC area 601 and part of the PEUs among the PEUs 610(A+1) to 610(B) of the TLC area 602. For example, in the present exemplary embodiment, the host system 11 accesses the data stored in the SLC area 601 and the TLC area 602 through a logical address (LA). Therefore, each LU in the LUs 612(0) to 612(C) refers to one logical address. In addition, each LU in the LUs 612(0) to 612(C) may also refer to one LPU, one LEU or a composition of a plurality of continuous or discontinuous logical addresses. Also, each LU in the LUs 612(0) to 612(C) may also be mapped to one or more PEUs. It should be noted that, the exemplary embodiments of the invention are described with the example in which the MMC 502 logically groups the PEUs 610(0) to 610(B) of the RNVM module 406 into the SLC area 601 and the TLC area 602. However, the invention is not limited thereto. For example, in another exemplary embodiment, the MMC 502 may also logically group the PEUs 610(0) to 610(B) of the RNVM module 406 into a SLC area and a MLC area.

The MMC 502 records a mapping relation (also known as a logical-physical mapping relation) between the LUs and the PEUs into at least one logical-physical mapping table. When the host system 11 intends to read the data from the memory storage apparatus 10 or write the data into the memory storage apparatus 10, the MMC 502 may access the data in the memory storage apparatus 10 according to the L2P table.

Particularly, in the present exemplary embodiment, the MMC 502 also configures the PEUs 610(0) to 610(A) (hereinafter, also known as first PEUs) belonging to the SLC area 601 to be programmed based on a single programming mode initially, and configures the PEUs 610(A+1) to 610(B) (hereinafter, also known as second PEUs) belonging to the TLC area 602 to be programmed based on a multi-page programming mode initially. Generally, a programming speed for programming the memory cells based on the single page programming mode is higher than a programming speed for programming the memory cells based on the multi-page programming mode. Moreover, a reliability of the data stored based on the single page programming mode is often higher than a reliability of the data stored based on the multi-page programming mode. In this embodiment, the PEUs 610(0) to 610(A) belonging to the SLC area 601 are only programmed by using the single page programming mode, and the PEUs 610(A+1) to 610(B) belonging to the TLC area 602 are only programmed by using the multi-page programming mode.

In the present exemplary embodiment, the single programming mode refers to one of a single layer memory cell (SLC) mode, a lower physical programming mode, a mixture programming mode and a less layer memory cell mode. In the single layer memory cell mode, one memory cell is only stored with data of one bit. In the lower physical programming mode, only the lower PPUs are programmed, and the upper PPUs corresponding to the lower PPUs do not have be programmed. In the mixture programming mode, valid data (or real data) are programmed into the lower PPUs, and dummy data is programmed into the upper PPUs corresponding to the lower PPUs stored with the valid data. In the less layer memory cell mode, one memory cell stores data with a first number of bits. For example, the first number may be set to "1".

In the present exemplary embodiment, the multi-page programming mode refers to a Multi level cell (MLC) programming mode, a Trinary level cell (TLC) programming mode or other similar modes. In the multi-page programming mode, one memory cell is stored with data of a second number of bits, and the second number is equal to or greater than "2". For example, the second number may be set to 2 or 3. In another exemplary embodiment, the first number in the single programming mode and the second number in the multi-page programming mode may be other numbers as long as the second number is greater than the first number.

In general, the number of PEUs in the SLC area 601 and the number of PEUs in the TLC area 602 are set before the RNVM module 406 is shipped from the factory. Depending on an user's usage habits or an operating logic of an application, the ratio in which the PEUs in the SLC area 601 are used is also different from the ratio in which the PEUs in the TLC area 602 are used. Thus, when the RNVM module 406 reaches the end of the life cycle (e.g., the sum of wear level values of all PEUs is greater than a threshold), one of the SLC area 601 and the TLC area 602 may not have reached the maximum amount of writes (e.g., number of writes) that the area can withstand. However, how the SLC area 601 and the TLC area 602 can simultaneously achieve the maximum amount of writes at the same time when the RNVM module 406 reaches the end of the life cycle, which is one of the problems that one skilled in the art would like to solve.

Therefore, the present invention provides a valid data merging method, which can select a PEU (also referred to as a target PEU) from one of the SLC area 601 and the TLC area 602 for writing in performing the valid data merging operation according to a system parameter corresponding to the SLC area 601 and a system parameter corresponding to the TLC area 602. Thereby, the ratio of both the SLC area 601 and the TLC area 602 in use is made close. By the above manner, it is possible to prevent the problem that one of the SLC area 601 and the TLC area 602 may not have reached the maximum amount of writes that the area can withstand when the RNVM module 406 reaches the end of the life cycle.

Figure 7:
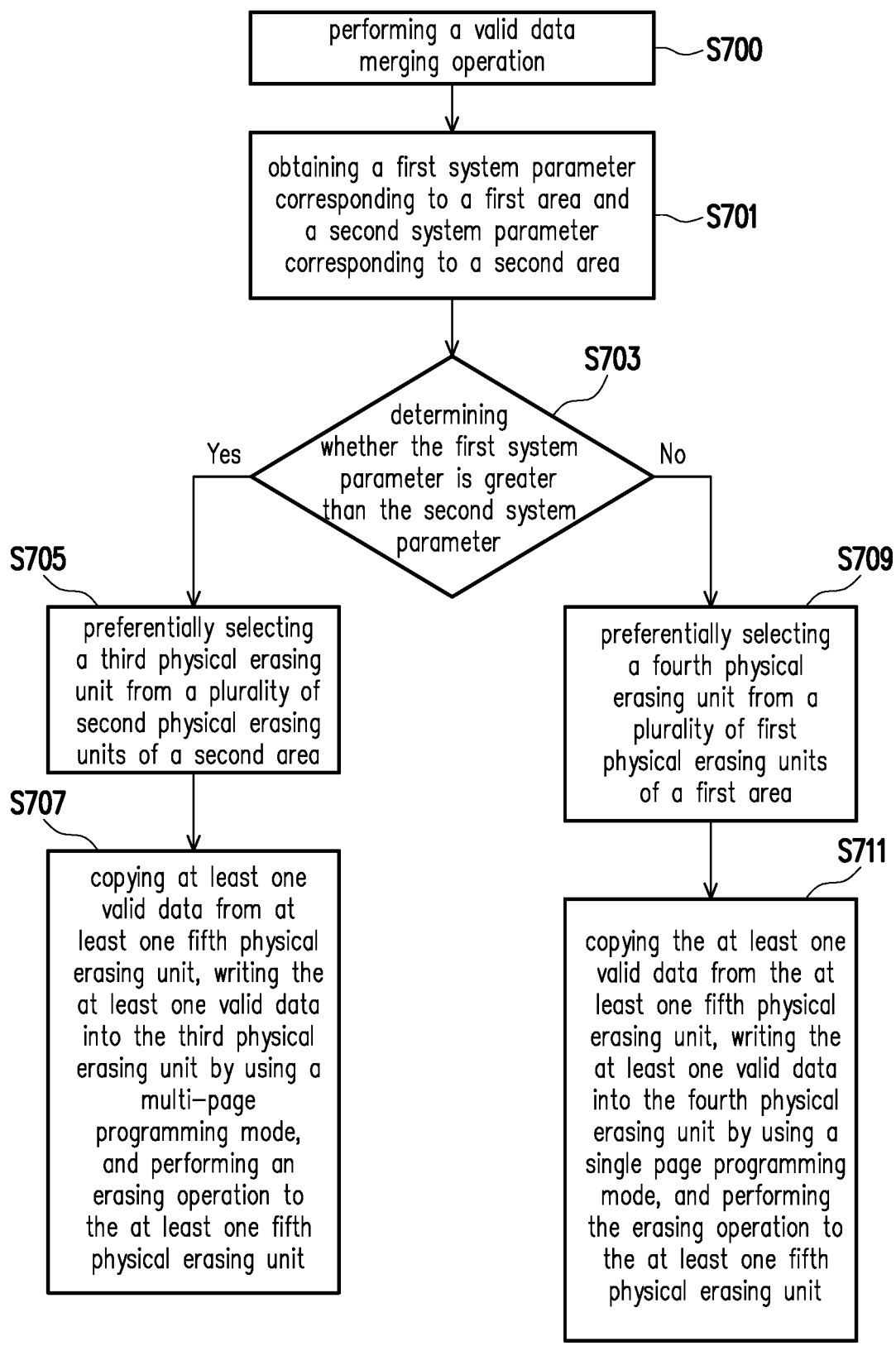
FIG. 7 is a flow chart illustrating the valid data merging method according to an exemplary embodiment of the invention.

In more detail, FIG. 7 is a flow chart illustrating the valid data merging method according to an exemplary embodiment of the invention.

Referring to FIG. 7, when the number of idle PEUs in the spare area of the RNVM module 406 is not greater than a predefined value, in step S700, the MMC 502 will perform a valid data merging operation. Specifically, when the number of the idle PEUs in the spare area is not greater than the predefined value, it means that the PEUs that can be used for writing in the spare area is insufficient. The MMC 502 would release more space to the spare area by performing the valid data merging operation.

When the valid data merging operation is to be performed, the MMC 502 obtains a system parameter (also referred to as a first system parameter) corresponding to the SLC area 601 and a system parameter (also referred to as a second system parameter) corresponding to the TLC area 602 in step S701. In this embodiment, the first system parameter and the second system parameter are of the same type and comprise at least one of a wear level value and a write amplification factor. Here, the wear level value is related to at least one of the number of erasures, the number of programmings, the number of readings, the number of error bits, and the error bit rate of the PEUs. In other words, taking the first system parameter as an example, the first system parameter may be the sum of the number of erasures, the sum of the number of programmings, the sum of the number of readings, the sum of the number of error bits and/or the error bit rate of all the PEUs in the SLC area 601. The write amplification factor can be well known to those skilled in the art, and will not be described herein.

After obtaining the first system parameter and the second system parameter, in step S703, the MMC 502 determines whether the first system parameter is greater than the second system parameter.

When the first system parameter is greater than the second system parameter, it means that the usage rate of the SLC area 601 is higher than the usage rate of the TLC area 602. Therefore, in step S705, the MMC 502 preferentially selects a PEU (also referred to as a third PEU) of the spare area from the second PEUs 610 (A+1) to 610 (B) of the TLC area 602. The third PEU is used as the target PEU for writing in the valid data merging operation. After that, in step S707, the MMC 502 copies valid data from at least one PEU (also referred to as a fifth PEU) of the storage area, and writes the valid data into the selected third PEU by using the multi-page programming mode. Thereafter, the MMC 502 may perform an erasing operation to the fifth PEU and re-associate the fifth PEU into the spare area.

When the first system parameter is not greater than the second system parameter, it means that the usage rate of the SLC area 601 is lower than the usage rate of the TLC area 602. Therefore, in step S709, the MMC 502 preferentially selects a PEU (also referred to as a fourth PEU) of the spare area from the PEUs 610(0) to 610(A) of the SLC area 601. The fourth PEU is used as the target PEU for writing in the valid data merging operation. After that, in step S711, the MMC 502 copies valid data from at least one PEU (also referred to as the fifth PEU) of the storage area, and writes the valid data into the selected fourth PEU by using the single page programming mode. Thereafter, the MMC 502 may perform an erasing operation to the fifth PEU and re-associate the fifth PEU into the spare area.

It should be noted that, in the foregoing step S705, in some cases, the MMC 502 may not able to select a PEU that belongs to the spare area from the PEUs 610(A+1) to 610(B) of the TLC area 602 (For example, when the PEUs 610(A+1) to 610(B) of the TLC area 602 does not have a PEU belonging to the spare area). In this case, when the MMC 502 cannot select the PEU belonging to the spare area from the PEUs 610(A+1) to 610(B) of the TLC area 602 in step S705, the MMC 502 can, for example, perform the operation of finding and selecting a PEU belonging to the spare area from the PEUs 610(0) to 610(A) of the SLC area 601 to perform the valid data merging operation. Similarly, in the foregoing step S709, the MMC 502 may not be able to select the PEU belonging to the spare area from the PEUs 610(0) to 610(A) of the SLC area 601 in some cases (For example, when the PEUs 610(0) to 610(A) of the SLC area 601 do not have a PEU belonging to the spare area). In this case, when the MMC 502 cannot select the PEU belonging to the spare area from the PEUs 610(0) to 610(A) of the SLC area 601 in step S709, the MMC 502 can, for example, perform the operation of finding and selecting a PEU belonging to the spare area from the PEUs 610(A+1) to 610(B) of the TLC area 602 to perform the valid data merging operation.

In summary, the valid data merging method, the memory control circuit unit and the memory storage apparatus of the present invention may select a physical erasing unit from one of the SLC area and the TLC area for writing in performing the valid data merging operation according to a system parameter corresponding to the SLC area and a system parameter corresponding to the TLC area. Thereby, the ratio of both the SLC area and the TLC area in use is made close. By the above manner, it is possible to prevent the problem that one of the SLC area and the TLC area may not have reached the maximum amount of writes that the area can withstand when the rewritable non-volatile memory module reaches the end of the life cycle.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A valid data merging method for a rewritable non-volatile memory module, wherein the rewritable non-volatile memory module includes a plurality of physical erasing units, the plurality of physical erasing units are grouped into at least a first area and a second area, the first area includes a plurality of first physical erasing units of the plurality of physical erasing units and the second area includes a plurality of second physical erasing units of the plurality of physical erasing units, and the valid data merging method comprises:

obtaining a first system parameter corresponding to the first area and a second system parameter corresponding to the second area when performing a valid data merging operation;

determining whether the first system parameter is greater than the second system parameter;

when the first system parameter is greater than the second system parameter, preferentially selecting a third physical erasing unit from the plurality of second physical erasing units of the second area, and performing the valid data merging operation by using the third physical erasing unit; and when the first system parameter is not greater than the second system parameter, preferentially selecting a fourth physical erasing unit from the plurality of first physical erasing units of the first area, and performing the valid data merging operation by using the fourth physical erasing unit, wherein the plurality of physical erasing units are at least grouped into a storage area and a spare area, each of the first area and the second area comprises the storage and the spare areas, the third physical erasing unit and the fourth physical erasing unit belong to the spare area, when a number of the spare area of the second area is lower than a first threshold, selecting the third physical erasing unit from the plurality of first physical erasing units of the first area, when a number of the spare area of the first area is lower than a second threshold, selecting the fourth physical erasing unit from the plurality of second physical erasing units of the second area.

2. The valid data merging method according to claim 1, wherein each of the plurality of first physical erasing units is programmed only by using a single page programming mode, and each of the plurality of second physical erasing units is programmed only by using a multi-page programming mode.

3. The valid data merging method according to claim 1, wherein the step of performing the valid data merging operation by using the third physical erasing unit comprises:

copying at least one valid data from at least one fifth physical erasing unit, writing the at least one valid data into the third physical erasing unit by using a multi-page programming mode, and performing an erasing operation to the at least one fifth physical erasing unit, wherein the step of performing the valid data merging operation by using the fourth physical erasing unit comprises:

copying the at least one valid data from the at least one fifth physical erasing unit, writing the at least one valid data into the fourth physical erasing unit by using a single page programming mode, and performing the erasing operation to the at least one fifth physical erasing unit.

4. The valid data merging method according to claim 3, wherein the fifth physical erasing unit belongs to the storage area.

5. The valid data merging method according to claim 1, wherein the first system parameter and the second system parameter comprise at least one of a wear level value and a write amplification factor.

6. A memory control circuit unit for controlling a rewritable non-volatile memory module, wherein the memory control circuit unit comprises:

a host interface, configured to couple to a host system;

a memory interface, configured to couple to the rewritable non-volatile memory module, wherein the rewritable non-volatile memory module includes a plurality of physical erasing units, the plurality of physical erasing units are grouped into at least a first area and a second area, the first area includes a plurality of first physical erasing units of the plurality of physical erasing units and the second area includes a plurality of second physical erasing units of the plurality of physical erasing units; and a memory management circuit, coupled to the host interface and the memory interface, wherein the memory management circuit is configured to obtain a first system parameter corresponding to the first area and a second system parameter corresponding to the second area when performing a valid data merging operation, wherein the memory management circuit is further configured to determine whether the first system parameter is greater than the second system parameter, when the first system parameter is greater than the second system parameter, the memory management circuit is further configured to preferentially select a third physical erasing unit from the plurality of second physical erasing units of the second area, and perform the valid data merging operation by using the third physical erasing unit, when the first system parameter is not greater than the second system parameter, the memory management circuit is further configured to preferentially select a fourth physical erasing unit from the plurality of first physical erasing units of the first area, and perform the valid data merging operation by using the fourth physical erasing unit, wherein the plurality of physical erasing units are at least grouped into a storage area and a spare area, each of the first area and the second area comprises the storage and the spare areas, the third physical erasing unit and the fourth physical erasing unit belong to the spare area, when a number of the spare area of the second area is lower than a first threshold, the memory management circuit is further configured to select the third physical erasing unit from the plurality of first physical erasing units of the first area, when a number of the spare area of the first area is lower than a second threshold, the memory management circuit is further configured to select the fourth physical erasing unit from the plurality of second physical erasing units of the second area.

7. The memory control circuit unit according to claim 6, wherein each of the plurality of first physical erasing units is programmed only by using a single page programming mode, and each of the plurality of second physical erasing units is programmed only by using a multi-page programming mode.

8. The memory control circuit unit according to claim 6, wherein in the operation of performing the valid data merging operation by using the third physical erasing unit, the memory management circuit is further configured to copy at least one valid data from at least one fifth physical erasing unit, write the at least one valid data into the third physical erasing unit by using a multi-page programming mode, and perform an erasing operation to the at least one fifth physical erasing unit, wherein in the operation of performing the valid data merging operation by using the fourth physical erasing unit, the memory management circuit is further configured to copy the at least one valid data from the at least one fifth physical erasing unit, write the at least one valid data into the fourth physical erasing unit by using a single page programming mode, and perform the erasing operation to the at least one fifth physical erasing unit.

9. The memory control circuit unit according to claim 8, wherein the fifth physical erasing unit belongs to the storage area.

10. The memory control circuit unit according to claim 6, wherein the first system parameter and the second system parameter comprise at least one of a wear level value and a write amplification factor.

11. A memory storage apparatus, comprising:
a connection interface unit, configured to couple to a host system;
a rewritable non-volatile memory module, wherein the rewritable non-volatile memory module includes a plurality of physical erasing units, the plurality of physical erasing units are grouped into at least a first area and a second area, the first area includes a plurality of first physical erasing units of the plurality of physical erasing units and the second area includes a plurality of second physical erasing units of the plurality of physical erasing units; and
a memory control circuit unit, coupled to the connection interface unit and the rewritable non-volatile memory module,
wherein the memory control circuit unit is configured to obtain a first system parameter corresponding to the first area and a second system parameter corresponding to the second area when performing a valid data merging operation,
wherein the memory control circuit unit is further configured to determine whether the first system parameter is greater than the second system parameter,
when the first system parameter is greater than the second system parameter, the memory control circuit unit is further configured to preferentially select a third physical erasing unit from the plurality of second physical erasing units of the second area, and perform the valid data merging operation by using the third physical erasing unit,
when the first system parameter is not greater than the second system parameter, the memory control circuit unit is further configured to preferentially select a fourth physical erasing unit from the plurality of first physical erasing units of the first area, and perform the valid data merging operation by using the fourth physical erasing unit,
wherein the plurality of physical erasing units are at least grouped into a storage area and a spare area, each of the first area and the second area comprises the storage and the spare areas, the third physical erasing unit and the fourth physical erasing unit belong to the spare area,
when a number of the spare area of the second area is lower than a first threshold, the memory control circuit unit is further configured to select the third physical erasing unit from the plurality of first physical erasing units of the first area,
when a number of the spare area of the first area is lower than a second threshold, the memory control circuit unit is further configured to select the fourth physical erasing unit from the plurality of second physical erasing units of the second area.

12. The memory storage apparatus according to claim 11, wherein each of the plurality of first physical erasing units is programmed only by using a single page programming mode, and each of the plurality of second physical erasing units is programmed only by using a multi-page programming mode.

13. The memory storage apparatus according to claim 11, wherein in the operation of performing the valid data merging operation by using the third physical erasing unit,
the memory control circuit unit is further configured to copy at least one valid data from at least one fifth physical erasing unit, write the at least one valid data into the third physical erasing unit by using a multi-page programming mode, and perform an erasing operation to the at least one fifth physical erasing unit,
wherein in the operation of performing the valid data merging operation by using the fourth physical erasing unit,
the memory control circuit unit is further configured to copy the at least one valid data from the at least one fifth physical erasing unit, write the at least one valid data into the fourth physical erasing unit by using a single page programming mode, and perform the erasing operation to the at least one fifth physical erasing unit.

14. The memory storage apparatus according to claim 13, wherein the fifth physical erasing unit belongs to the storage area.

15. The memory storage apparatus according to claim 11, wherein the first system parameter and the second system parameter comprise at least one of a wear level value and a write amplification factor.

* * * * *